United States Patent
Richter et al.

(10) Patent No.: US 7,061,138 B2
(45) Date of Patent: Jun. 13, 2006

(54) POWER SUPPLY SYSTEM WITH TWO ELECTRICAL ENERGY STORES

(75) Inventors: Gerolf Richter, Hildesheim (DE); Martin Schreiber, Hohenhameln (DE)

(73) Assignee: VB Autobatterie GmbH & Co. KGAA, Hannover (DE)

( * ) Notice: Subject to any disclaimer, the term of this patent is extended or adjusted under 35 U.S.C. 154(b) by 467 days.

(21) Appl. No.: 10/236,494

(22) Filed: Sep. 6, 2002

(65) Prior Publication Data
US 2003/0062773 A1 Apr. 3, 2003

(30) Foreign Application Priority Data
Sep. 8, 2001 (DE) ................. 101 44 282

(51) Int. Cl.
*H02H 7/18* (2006.01)
(52) U.S. Cl. ....................... 307/10.7; 307/86
(58) Field of Classification Search ............. 307/46, 307/48; 320/161, 165
See application file for complete search history.

(56) References Cited

U.S. PATENT DOCUMENTS

| 4,056,764 | A | | 11/1977 | Endo et al. |
| 4,604,565 | A | * | 8/1986 | Yokota et al. ............... 320/123 |
| 5,181,170 | A | * | 1/1993 | Huang et al. ............ 363/21.04 |
| 5,316,868 | A | | 5/1994 | Dougherty et al. |
| 5,793,185 | A | * | 8/1998 | Prelec et al. ................. 320/104 |
| 5,844,325 | A | | 12/1998 | Waugh et al. |
| 6,127,741 | A | * | 10/2000 | Matsuda et al. ............. 307/9.1 |
| 6,473,630 | B1 | * | 10/2002 | Baranowski et al. ........ 455/572 |
| 6,580,180 | B1 | * | 6/2003 | Tamai et al. ................ 307/10.1 |
| 6,727,602 | B1 | * | 4/2004 | Olson .......................... 307/46 |

* cited by examiner

*Primary Examiner*—Brian Sircus
*Assistant Examiner*—Andrew Deschere
(74) *Attorney, Agent, or Firm*—Foley & Lardner LLP

(57) ABSTRACT

The invention relates to an electrical power supply system for feeding electrical loads, having at least two electrical energy stores, a circuit for connecting the electrical energy stores to an electrical d.c. network with loads and at least one power generator, wherein each energy store can be connected to the d.c. network by activating switching elements by means of d.c. transformers.

17 Claims, 2 Drawing Sheets

POWER SUPPLY SYSTEM WITH TWO ELECTRICAL ENERGY STORES

RELATED APPLICATION

This application claims priority of German Patent Application No. DE 101 44 282.3, filed Sep. 8, 2001.

FIELD OF THE INVENTION

This invention relates to an electrical power supply system for feeding electrical loads, having at least two electrical energy stores, a circuit for connecting the electrical energy stores (batteries) to an electrical d.c. network with loads and at least one energy generator. Such an electrical power supply system is preferably installed as a vehicle-mounted electrical system in vehicles.

BACKGROUND

U.S. Pat. No. 4,056,764 describes a power supply system with two batteries which are connected in parallel and which have a different characteristic and a power-limiting circuit which is connected upstream of a battery.

U.S. Pat. No. 5,316,868 describes a circuit for electrically connecting a primary battery and a secondary battery to a load and to a control unit which connects said secondary battery into the circuit if additional electrical power is required.

EP 0 363 356 B1 discloses a voltage supply system with a d.c./d.c. transformer for electronic devices, in particular, for safety-related devices in motor vehicles in which groups of devices, or each individual device, is assigned a separate supply circuit with an independent auxiliary voltage source which maintains the power supply of the associated electrical device if there is a fault in the supply circuit.

EP 0 398 691 B1 discloses a power distribution system in which an electrical connection is formed between a first and a second power source for a period of time as a function of the presence or absence of physical states, for example, a driver getting into a vehicle.

U.S. Pat. No. 5,844,325 describes a multiple battery system and its control in which a switch enables the same poles of two batteries to be connected to one another and a second switch permits the supply to auxiliary loads to be interrupted.

Publication DE 19855245 A1 describes a redundant voltage supply for electrical loads in a vehicle-mounted electrical system, in particular, for brakes which can be actuated electrically, having a generator which supplies two separate voltage branches which are d.c. isolated by means of a d.c. voltage transformer and can each be connected to their own voltage store and to the electrical loads, switching elements which are normally in the conductive state being located between each battery and the associated voltage branch, and between each battery and the load.

DE 19951128 A1 discloses a method for regulating the voltage in a vehicle-mounted electrical system with two batteries which can be charged by a generator and which are used to supply loads and can be connected to one another by means of a voltage transformer of a control device, it being possible to supply the control unit with information which is typical of the engine or vehicle-mounted network and is processed by a microcomputer, and to adapt the charge power for the starter battery in terms of timing to fluctuating power demands of electrical loads and to power outputs of the generator which fluctuate as a function of the engine speed, and to the capacity utilization of the generator.

In these known power supply systems with two batteries, it is impossible or possible only to a limited degree, to operate a targeted battery management system to avoid system faults due to inadequate charging and battery failures, and to ensure the emergency operating capability.

It would accordingly be advantageous to provide a power supply system having at least two electrical energy stores, which power supply system has improved reliability and availability by virtue of the possibility of battery management and redundancy in the case of a battery failure.

SUMMARY OF THE INVENTION

This invention relates to an electrical power supply system for feeding electrical loads including at least two electrical energy stores, a circuit connecting the electrical energy stores to an electrical d.c. network having at least one load and at least one power generator, wherein each energy store is connected to the d.c. network by at least one activating switching element, the switching elements being activated by a control unit.

BRIEF DESCRIPTION OF THE DRAWINGS

An exemplary embodiment of the new electrical power supply system is schematically represented in FIG. 1.

DETAILED DESCRIPTION

The power supply system according to the invention permits energy stores to be decoupled from the d.c. network by the intermediate connection of a d.c. transformer. Each battery can preferably be connected directly to the d.c. network by means of a power switch and to the d.c. transformer by means of a load switch. However, it is preferable to use semiconductor switching elements instead of switches. The switching elements are actuated by a control unit in which measured values of physical variables, for example, temperatures, pressure, current strength or voltage level, determined by sensors, are processed and a value of the load state (SOC, state of charge), a value of the readiness for use (SOH, state of health) or other derived variables for an energy store is determined therefrom. However, the targeted switching off of individual loads and interventions which are compatible with requirements into an engine management system are also provided. A particular advantage of the power supply system is that for the first time each individual battery can be charged in a way compatible with requirements independently of the current voltage level. As a result, inadequate charging of the at least two redundantly connected batteries can be largely avoided.

In the power supply system it is, inter alia, possible to monitor the load state of the batteries by means of the control unit. If it is detected at the batteries that a value drops below a critical charge state, a multistage charge strategy is started. If, for example, the power drain is too low due to low temperatures, each battery can be connected to the d.c. network by means of the d.c. transformer. Temperature-adapted charging is possible by controlling the variable output voltage.

During individual charging, the operational capability of the batteries is checked by checking the level and duration of the power drain. In the case of a defect, the faulty battery is disconnected completely and its prompt replacement is initiated by means of a message. The emergency operating capability is ensured by means of the second battery.

For the particularly dangerous case of a spontaneous short circuit of one of the at least two batteries, the direction of current is detected, which can be carried out either by means of a voltage measurement at shunts connected in series with the batteries or by means of Hall probes or by measuring the contact voltage of the power switches, as only the direction information is important for the actuation of the power switches by the control unit.

Figure 1:
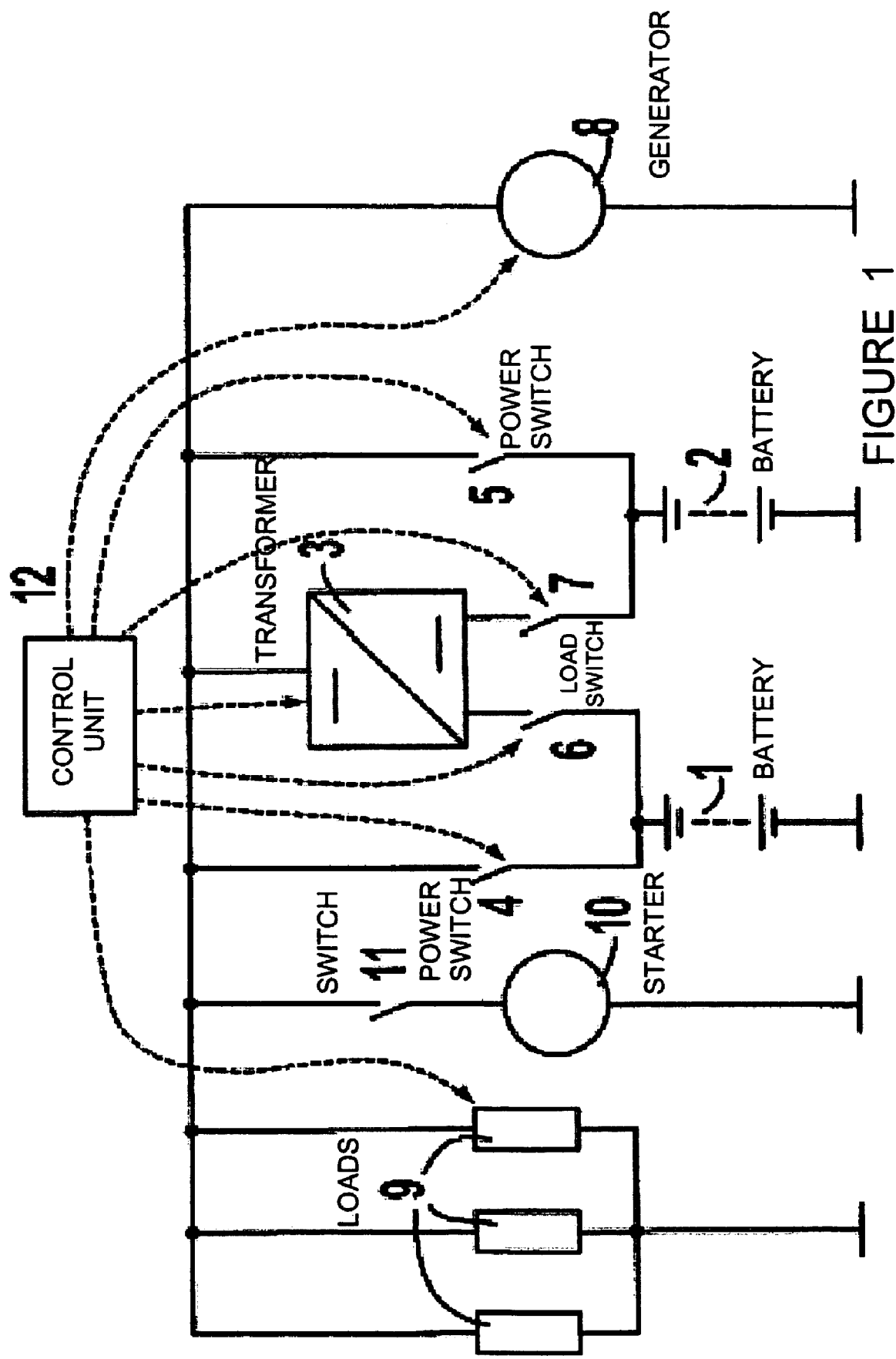

Turning now to the drawings in general and, in particular, FIG. 1, it shows how battery 1 can be connected directly by means of a power switch 4, or indirectly by means of a load switch 6 and the d.c. transformer 3, to a d.c. network. Battery 2 is connected directly by means of a power switch 5, or indirectly by means of a load switch 7 and d.c. transformer 3, to the d.c. network. Generation of power is preferably carried out with a generator 8. A starter 10, which is connected via a switch 11 to the d.c. network, is provided for the operation of starting an engine. Further loads 9 are also connected to the system. The d.c. network and the battery management system are controlled by means of a control unit 12. The lines (dashed) of action which start from the control unit 12 show that targeted influencing of loads 9 and generator 8 enables those of the d.c. network to be influenced to ensure voltage stability and emergency operating properties.

Figure 2:
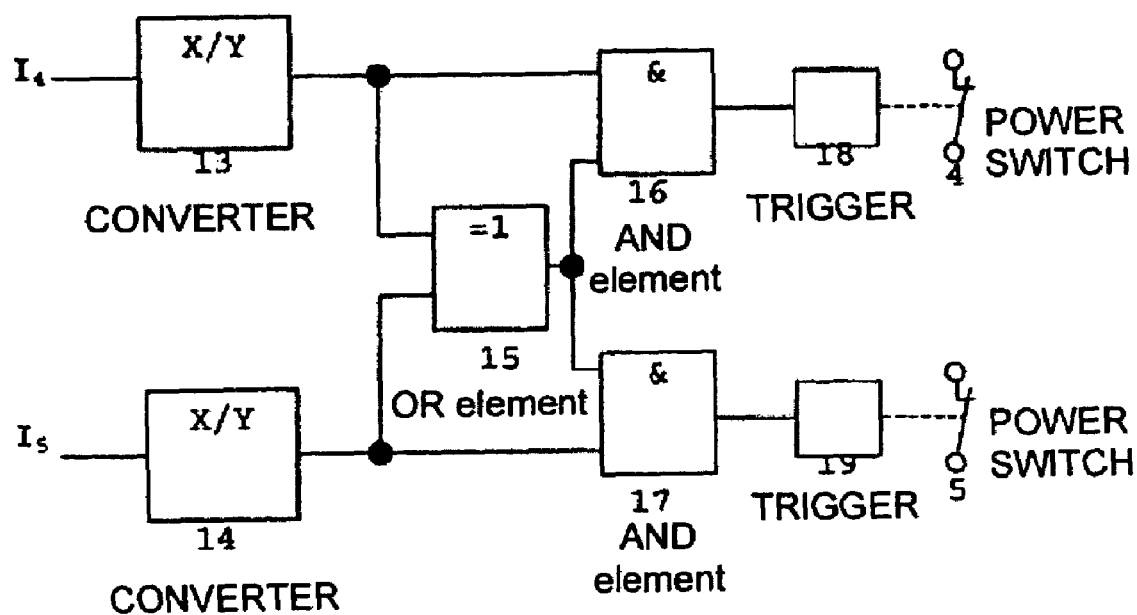
FIG. 2 shows a circuit for monitoring the direction of current in the batteries.

FIG. 2 represents the logical operation of a circuit for monitoring the direction of current in batteries 1 and 2 by measuring currents $I_4$ and $I_5$ in closed power switches 4 and 5. Evaluation of the direction of current in the battery paths is sufficient for the conversion into a switching logic. The directions of current are converted using the signal level converters 13 and 14 so that a positive current (discharge) becomes logic "1" and a negative current (charge) becomes logic "0". The output signals of the converters are fed to one associated AND element 16 and 17 each and to one exclusive OR element 15. The output signal of the exclusive OR element 15 is fed to the second inputs of the two AND elements 16 and 17. The output of the AND elements 16 and 17 is connected to, in each case, one trigger 18 and 19 of a power switch 4 and 5 which, in the event of a fault, disconnects the associated battery 1 or 2 from the d.c. network by opening the closed power switch 4 or 5.

In the following table, a simple case of the monitoring of a vehicle-mounted electrical system with two batteries connected in parallel is described by way of example. In columns $I_1$ and $I_2$, a (+) stands for a discharge current of a battery, and a (−) stands for a charge current. In the columns for the power switches 4 and 5, a "1" indicates that the corresponding switch is switched on, and a "0" indicates that it is switched off.

Actuation of the load switches as a function of the direction of current

| Case | $I_1$ | $I_2$ | 4 | 5 |
|---|---|---|---|---|
| 1 | + | + | 1 | 1 |
| 2 | + | − | 1 | 0 |
| 3 | − | + | 0 | 1 |
| 4 | − | − | 1 | 1 |

In case 1, both batteries are discharged: the power switches 4 and 5 are closed. In case 2, battery 1 outputs current and battery 2 takes up current. Switch 5 is opened and battery 2 is disconnected. Case 3 shows the other case in which battery 1 takes up current and battery 2 outputs current: switch 4 is opened and battery 1 is disconnected. In case 4, both batteries are charged directly from the d.c. network and the switches remain closed.

The invention claimed is:

1. An electrical power supply system for feeding electrical loads comprising:
    at least two electrical energy stores, and
    a circuit connecting the electrical energy stores to an electrical d.c. network having at least one load and at least one power generator,
    wherein each energy store is connected to the d.c. network by at least one activating switching element and at least one d.c. transformer for decoupling the at least two electrical energy stores from the d.c. network, the at least one activating switching element and the at least one d.c. transformer being activated by a control unit that monitors the direction of current in the at least two electrical energy stores.

2. The electrical power supply system as claimed in claim 1, wherein the system is installed as a vehicle-mounted electrical system.

3. The electrical power supply system as claimed in claim 1, wherein the at least one d.c. transformer can be controlled unidirectionally and in terms of their output voltage.

4. The electrical power supply system as claimed in claim 1, wherein the at least one d.c. transformer is connected to the at least one activating switching element.

5. The electrical power supply system as claimed in claim 1, wherein the at least one d.c. transformer is connected directly to the d.c. network.

6. The electrical power supply system as claimed in claim 1, Wherein the connection between at least one of the at least two electrical energy stores and the at least one d.c. transformer is formed by a load switch.

7. The electrical power supply system as claimed in claim 1, wherein connections of the at least two electrical energy stores to the d.c. network and to the at least one d.c. transformer are formed by semiconductor switching elements.

8. The electrical power supply system as claimed in claim 1, wherein the at least one activating switching element or at least one d.c. transformer is actuated by a control unit which determines and evaluates physical variables by at least one sensor selected from the group consisting of temperature sensors, pressure sensors, current sensors and voltage sensors.

9. The electrical power supply system as claimed in claim 1, wherein the at least one activating switching element or at least one d.c. transformer is actuated by a control unit which, from measured physical variables, determines a value of load state, a value of the readiness for use, or other derived variables for at least one of the at least two electrical energy stores.

10. The electrical power supply system as claimed in claim 1, wherein faulty ones of the at least two energy stores can be switched off by the at least one activating switching element actuated by a control unit as a function of determined physical and derived variables.

11. An electrical power supply system for feeding electrical loads, having at least two electrical energy stores, a circuit for connecting the electrical energy stores to an electrical d.c. network with loads and at least one power generator, wherein each energy store can be connected to the d.c. network by activating switching elements and by means of at least one d.c. transformer provided for decoupling energy stores from the d.c. network, the activating switching elements and the at least one d.c. transformer configured for actuation by a control unit based on the direction of current.

12. The electrical power supply system as claimed in claim 11, wherein the at least one d.c. transformer can be controlled unidirectionally and in terms of its output voltage.

13. The electrical power supply system as claimed in claim 11, wherein a single d.c. transformer is connected to the activating switching elements.

14. The electrical power supply system as claimed in claim 11, wherein the at least one d.c. transformer is connected directly to the d.c. network.

15. The electrical power supply system as claimed in claim 11, wherein the connection between at least one of the energy stores and the at least one d.c. transformer is formed by a load switch.

16. The electrical power supply system as claimed in claim 11, wherein the switching elements or at least one d.c. transformer is actuated by a control unit which determines and evaluates physical variables by at least one sensor selected from the group consisting of temperature sensors, pressure sensors, current sensors and voltage sensors.

17. The electrical power supply system as claimed in claim 11, wherein the switching elements or at least one d.c. transformer is actuated by a control unit which, from measured physical variables, determines a value of load state, a value of the readiness for use, or other derived variables for at least one of the energy stores.

\* \* \* \* \*